US011418857B2

(12) United States Patent
Kuai et al.

(10) Patent No.: US 11,418,857 B2
(45) Date of Patent: Aug. 16, 2022

(54) METHOD FOR CONTROLLING VR VIDEO PLAYING AND RELATED APPARATUS

(71) Applicant: Huawei Technologies Co., Ltd., Shenzhen (CN)

(72) Inventors: Duoci Kuai, Nanjing (CN); Bingjie Peng, Shenzhen (CN); Wei He, Shenzhen (CN); Liang Wu, Nanjing (CN); Yong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/338,261

(22) Filed: Jun. 3, 2021

(65) Prior Publication Data

US 2021/0297753 A1 Sep. 23, 2021

Related U.S. Application Data

(63) Continuation of application No. PCT/CN2019/121439, filed on Nov. 28, 2019.

(30) Foreign Application Priority Data

Dec. 4, 2018 (CN) .......................... 201811475821.5

(51) Int. Cl.
*G06F 3/04815* (2022.01)
*G06F 3/04817* (2022.01)
(Continued)

(52) U.S. Cl.
CPC ......... *H04N 21/8455* (2013.01); *G06F 3/011* (2013.01); *G06F 3/04815* (2013.01); *G06F 3/04817* (2013.01); *H04N 21/47217* (2013.01)

(58) Field of Classification Search
CPC .......... H04N 21/8455; H04N 21/47217; G06F 3/011; G06F 3/04815; G06F 3/04817
See application file for complete search history.

(56) References Cited

U.S. PATENT DOCUMENTS 6,195,497 B1 * 2/2001 Nagasaka .............. H04N 21/84
9,824,723 B1 11/2017 Bentley et al.
(Continued)

FOREIGN PATENT DOCUMENTS

CN 104219584 A 12/2014
CN 107209568 A 9/2017
(Continued)

*Primary Examiner* — Thai Q Tran
*Assistant Examiner* — Jose M Mesa
(74) *Attorney, Agent, or Firm* — Leydig, Voit & Mayer, Ltd.

(57) ABSTRACT

A method for controlling virtual reality (VR) video playing and an apparatus are provided. In this method, a video server device renders a jump icon in a video image. When a user wants to perform video jump based on video content, a jump icon corresponding to a scene in which the user is interested may be selected to form an input. The video server obtains, based on the input of the user, a jump time of a jump target video corresponding to the jump icon, and plays the jump target video for the user from the jump time. The jump target video may be a video that is being played, or may be another video. According to the application, a video can be switched based on preferences of the user.

20 Claims, 6 Drawing Sheets

(51) Int. Cl.
    *H04N 21/845*     (2011.01)
    *G06F 3/01*     (2006.01)
    *H04N 21/472*     (2011.01)

(56) References Cited

U.S. PATENT DOCUMENTS

| | | | |
|---|---|---|---|
| 2007/0180488 A1* | 8/2007 | Walter | H04N 21/4532 348/E5.103 |
| 2011/0265113 A1* | 10/2011 | Apfel | H04N 7/025 725/32 |
| 2015/0358650 A1 | 12/2015 | Kulkarni et al. | |

FOREIGN PATENT DOCUMENTS

| | | | |
|---|---|---|---|
| CN | 107547922 A | 1/2018 | |
| CN | 107908290 A | 4/2018 | |
| CN | 108376424 A | 8/2018 | |
| CN | 108632674 A | 10/2018 | |
| CN | 108769814 A | 11/2018 | |
| CN | 108882018 A | 11/2018 | |
| EP | 3304254 B1 | 10/2021 | |
| WO | WO-2015159128 A1 * | 10/2015 | H04N 21/2393 |
| WO | 2016118606 A1 | 7/2016 | |

\* cited by examiner

METHOD FOR CONTROLLING VR VIDEO PLAYING AND RELATED APPARATUS

CROSS-REFERENCE TO RELATED APPLICATIONS

This application is a continuation of International Application No. PCT/CN2019/121439, filed on Nov. 28, 2019, which claims priority to Chinese Patent Application No. 201811475821.5, filed on Dec. 4, 2018, both of which are hereby incorporated by reference in their entireties.

TECHNICAL FIELD

Embodiments of this application relate to the field of virtual reality technologies, and in particular, to a method for controlling VR video playing and related apparatuses.

BACKGROUND

The virtual reality (VR) technology is a computer simulation system through which a virtual world can be created and experienced. In the VR technology, a simulated environment is generated by using a computer. The VR technology provides a multi-source information fusion-based system simulation with a three-dimensional dynamic scene and an entity behavior that are interactive, to enable a user to be immersed into the environment. A VR panoramic video (VR 360-degree video) is a typical application scenario of the VR technology.

In a playing process of the VR panoramic video, a 360-degree panoramic image may be shown to a user. However, in the playing process, a VR device can only play directly from the beginning of the video to the end of the video, or a user drags a progress bar for fast-forward and rewind to a particular moment to continue playing. The VR device cannot switch playing scenes according to interest and preferences of the user, cannot interact with the user, and cannot provide personalized services for the user.

SUMMARY

The embodiments of the present invention provide a method for controlling VR video playing and related apparatuses, to provide personalized services for a user, and improve user watching experience of a VR video.

According to a first aspect, an embodiment of the present invention provides a method for controlling VR video playing. The method is performed by a video server device, and includes:

sending, by the video server device, one frame of first video image of a first video to a terminal device, where the first video image includes a jump icon, and the first video is a video being played by the video server device for the terminal device; and then, receiving, by the video server device, an input sent by the terminal device for selecting the jump icon; and obtaining, based on the input, a jump time of a jump target video corresponding to the jump icon; and next, sending, by the video server device, a second video image to the terminal device, where the second video image is one frame of video image corresponding to the jump time of the jump target video.

According to the method, the jump icon is included in the VR video image, so that when a user watches a video, the user may be prompted to perform video jump at the jump icon. The user can form the input by selecting the jump icon based on watched video content. The terminal device sends the input to the video server device. The video server completes the video jump, and quickly makes the video jump to a scene in which the user is interested. The method provides personalized services for the user, forms watching interaction with the user, and improves user experience of the VR video.

In a possible solution, the receiving an input sent by the terminal device for selecting the jump icon specifically includes: receiving input location information of the input sent by the terminal device, and determining, based on the input location information, that the input selects the jump icon.

According to the method, the jump icon selected by the user is determined based on the input location information of the input of the user, and the corresponding jump time is obtained, so that it can be ensured that the video server device performs video jump based on a selection of the user, and forms watching interaction with the user.

In a possible solution, before the first video image is sent to the terminal device, the method further includes: rendering, by the video server device, the jump icon at a jump location of the first video image, where the first video image is one frame of video image corresponding to a video frame identifier in the first video.

According to the method, the corresponding jump icon can be displayed at a corresponding location in the video image according to preset jump location information. Therefore, the user may determine, based on video content near a location of the jump icon in the video image, whether to perform video jump herein, so that video jump can be implemented more intuitively and effectively.

In a possible solution, before the first video image is sent to the terminal device, the method further includes: rendering, by the video server device, jump video prompt information at the jump location of the first video image. The jump video prompt information is used to prompt, to the user, video content after jump, and the jump video prompt information may be video image information, or text description information for the video content.

According to the method, the corresponding jump video prompt information can be displayed at a corresponding location in the video image according to the preset jump video prompt information. The jump video prompt information is used to prompt, to the user, the video content after jump, so that the user selects, according to interest and preferences of the user, whether to perform video jump herein, thereby making video jump implemented more intuitively and effectively.

In a possible solution, the jump target video is the first video, and the second video image is one frame of video image corresponding to the jump time of the first video.

According to the method, video jump can be implemented in one video, that is, jump of different video scenes is implemented in a same video, to help the user jump, based on preferences of the user, to a video scene in which the user is interested to continue watching without being limited by a time sequence of video playing, thereby improving watching experience of the user.

In a possible solution, the jump target video is a second video, the second video image is one frame of video image corresponding to a jump time of the second video, and the obtaining, based on the input, a jump time of a jump target video corresponding to the jump icon further includes: obtaining, based on the input, a playing address of the second video corresponding to the jump icon; and determining the second video image based on the playing address of the second video and the jump time of the second video.

According to the method, video jump can be implemented in different videos, that is, jump of different video scenes is implemented in different videos, to help the user jump, based on preferences of the user, to a video scene in which the user is interested to continue watching without being limited by a time sequence of video playing, and without being limited by video content being played. When the user is interested in a part of video scene, even if there is no relevant content in video content being played, the video server device may also jump to relevant content in other videos for playing for the user, provide personalized services for the user, and makes watching interaction with the user richer.

According to a second aspect, an embodiment of the present invention provides a method for controlling VR video playing. The method is performed by a terminal device, and includes: playing, by the terminal device, one frame of first video image of a first video, where the first video image includes a jump icon, and the first video is a video being played by the terminal device; then, receiving an input used for selecting the jump icon; and obtaining, based on the input, jump information corresponding to the jump icon, where the jump information includes a jump time of a jump target video; and next, playing, by the terminal device, a second video image, where the second video image is a video image corresponding to the jump time of the jump target video.

According to the method, the jump icon is included in the VR video image, so that when a user watches a video, the user may be prompted to perform video jump at the jump icon. The user can form the input by selecting the jump icon based on watched video content, and the terminal device completes video jump after receiving the input, and quickly makes the video jump to a scene in which the user is interested. The method provides personalized services for the user, forms watching interaction with the user, and improves user experience of the VR video.

In a possible solution, the receiving an input used for selecting the jump icon specifically includes:

receiving, by the terminal device, the input, and obtaining input location information of the input in the first video image, and determining, according to the received input location information, that the input selects the jump icon.

According to the method, the jump icon selected by the user is determined based on the input location information of the input of the user, and the corresponding jump information is obtained, so that it can be ensured that the terminal device performs video jump based on a selection of the user, and forms watching interaction with the user.

In a possible solution, before the first video image is played, the method further includes: rendering, by the terminal device, the jump icon at a jump location of the first video image, where the first video image is one frame of video image corresponding to a video frame identifier in the first video.

According to the method, the corresponding jump icon can be displayed at a corresponding location in the video image according to the preset jump location information. Therefore, the user may determine, based on video content near a location of the jump icon in the video image, whether to perform video jump herein, so that video jump can be implemented more intuitively and effectively.

In a possible solution, before the first video image is played, the method further includes: rendering, by the terminal device, jump video prompt information at the jump location of the first video image. The jump video prompt information is used to prompt, to the user, video content after jump, and the jump video prompt information may be video image information, or text description information for the video content.

According to the method, the corresponding jump video prompt information can be displayed at a corresponding location in the video image according to the preset jump video prompt information. The jump video prompt information is used to prompt, to the user, the video content after jump, so that the user selects, according to interest and preferences of the user, whether to perform video jump herein, thereby making video jump implemented more intuitively and effectively.

In a possible solution, the jump target video is the first video, and the second video image is one frame of video image corresponding to the jump time of the first video.

According to the method, video jump can be implemented in one video, that is, jump of different video scenes is implemented in a same video, to help the user jump, based on preferences of the user, to a video scene in which the user is interested to continue watching without being limited by a time sequence of video playing, thereby improving watching experience of the user.

In a possible solution, the jump target video is a second video, the second video image is one frame of video image corresponding to a jump time of the second video, and the obtaining, based on the input, a jump time of a jump target video corresponding to the jump icon further includes: obtaining, based on the input, a playing address of the second video corresponding to the jump icon; and determining the second video image based on the playing address of the second video and the jump time of the second video.

According to the method, video jump can be implemented in different videos, that is, jump of different video scenes is implemented in different videos, to help the user jump, based on preferences of the user, to a video scene in which the user is interested to continue watching without being limited by a time sequence of video playing, and without being limited by video content being played. When the user is interested in a part of video scene, even if there is no relevant content in video content being played, the video server device may also jump to relevant content in other videos for playing for the user, provide personalized services for the user, and makes watching interaction with the user richer.

According to a third aspect, an embodiment of the present invention provides a video server device. Refer to the description of the first aspect for beneficial effects. Details are not described herein again. The device has a function of implementing the behaviors in the method example in the foregoing first aspect. The function may be implemented by using hardware or may be implemented by using hardware executing corresponding software. The hardware or software includes one or more modules corresponding to the foregoing function. In a possible design, a structure of the video server device includes a sending module, a receiving module, and an obtaining module, where the modules may perform corresponding functions in the method example in the foregoing first aspect. Specifically refer to the detailed description in the method example. Details are not described herein again.

According to a fourth aspect, an embodiment of the present invention provides a terminal device. Refer to the description of the second aspect for beneficial effects. Details are not described herein again. The device has a function of implementing the behaviors in the method example in the foregoing second aspect. The function may be implemented by using hardware or may be implemented by using hardware executing corresponding software. The hardware or software includes one or more modules corresponding to the foregoing function. In a possible design, a structure of the terminal device includes a playing module, a receiving module, and an obtaining module, where the modules may perform corresponding functions in the method example in the foregoing second aspect. Specifically refer to the detailed description in the method example. Details are not described herein again.

According to a fifth aspect, an embodiment of the present invention further provides a video server device. Refer to the description of the first aspect for beneficial effects. Details are not described herein again. A structure of the device includes a processor, and may also include a transceiver or a memory, where the processor is configured to support the video server device in performing corresponding functions in the method of the foregoing first aspect. The memory is coupled to the processor, and stores program instructions and data that are necessary for the device. The transceiver is configured to communicate with another device.

According to a sixth aspect, an embodiment of the present invention further provides a terminal device. Refer to the description of the second aspect for beneficial effects. Details are not described herein again. A structure of the device includes a processor, and may also include a transceiver or a memory, where the processor is configured to support the terminal device in performing corresponding functions in the method of the foregoing second aspect. The memory is coupled to the processor, and stores program instructions and data that are necessary for the device. The transceiver is configured to communicate with another device.

According to a seventh aspect, the present invention further provides a computer-readable storage medium. The computer-readable storage medium includes a set of program code, to perform the method according to any implementation in the first aspect of the embodiments of the present invention.

According to an eighth aspect, the present invention further provides a computer-readable storage medium. The computer storage medium includes a set of program code, to perform the method according to any implementation in the second aspect of the embodiments of the present invention.

These aspects or other aspects of the present invention will be more brief and comprehensible in the descriptions of the following embodiments.

DESCRIPTION OF EMBODIMENTS

The embodiments of the present invention provide a method for controlling VR video playing and related apparatuses, to resolve the problem in the prior art that a playing scene cannot be switched according to preferences of a user in a playing process of a VR video, and interaction with the user cannot be performed.

Figure 1:
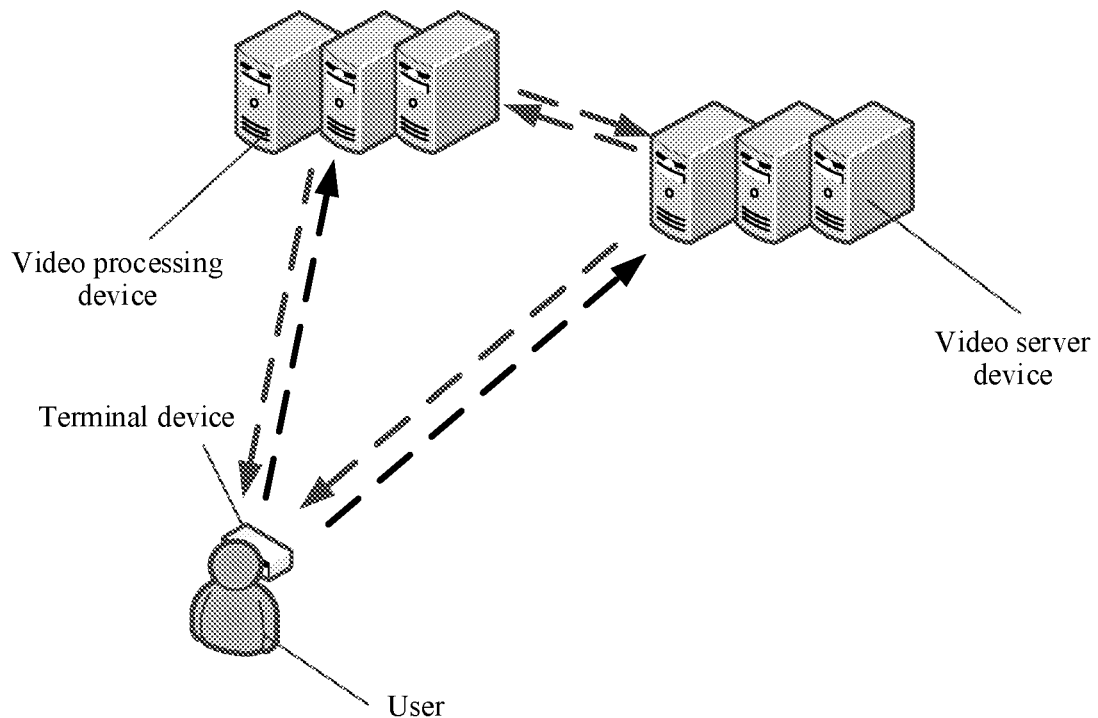
FIG. 1 is a schematic architectural diagram of a system according to an embodiment of the present invention.

FIG. 1 is a schematic architectural diagram of a system according to an embodiment of the present invention. A typical application scenario includes a video processing device, a video server device, and a terminal device.

The video processing device may be a computer device, and may have relatively strong video processing functions and data computing functions. For example, the video processing device may extract location information of an auxiliary tool in a video in a video image, and the like. In the embodiments of the present invention, the video processing device may process a recorded video to generate a VR video, and make jump information. The VR video and jump information that are processed by the video processing device may be uploaded into the video server device that controls playing of the video, or may be downloaded by the terminal device that controls playing of the video.

The video server device may be a local high-performance host, or a remote server deployed on cloud. The video server device may have relatively strong image processing functions and data computing functions, for example, may perform a rendering operation, a logical operation function, and the like. The video server device may be a super-multi-core server, a computer deployed with a graphics processing unit (GPU) cluster, a large distributed computer, a cluster computer with pooled hardware resources, or the like. In the embodiments of the present invention, the video server device may render a jump icon at a corresponding location of the jump information in the video image, and may play a target jump video to the user in response to an input of the user for selecting the jump icon.

The terminal device may be a device worn on the head of the user, such as VR glasses, a VR helmet, or the like, and may alternatively be a device worn on other parts of the user, such as a device worn on the hand, the elbow, the foot, and the knee of the user, for example, a gamepad, or the like. The terminal device may display the video image of the VR video to the user through a display. The terminal device may locally store data of the VR video and the jump information, may render the jump icon at the corresponding location of the jump information in the video image, and may play the target jump video to the user in response to the input of the user for selecting the jump icon. The terminal device may alternatively not locally store the data of the VR video and the jump information, and instead, stores all related data in the video server device, display the video image of the VR video when playing the VR video, and send input information of the user to the video server device.

Figure 2:
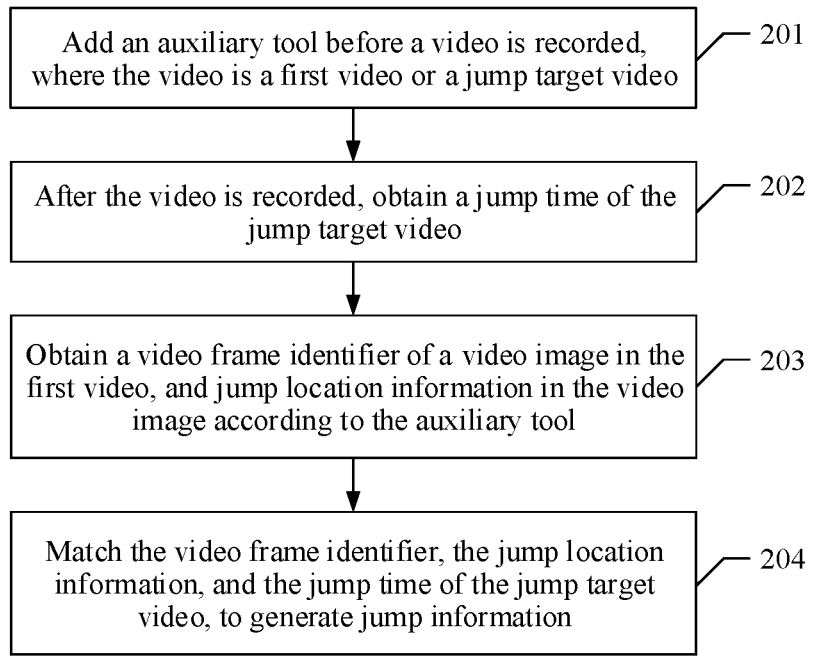
FIG. 2 is a schematic flowchart of a method for making jump information according to an embodiment of the present invention.

FIG. 2 is a schematic flowchart of a method for making jump information according to an embodiment of the present invention. Jump information is a collection of information required to jump to a jump target video in a first video, and may include a video frame identifier (ID) of a video image of the first video, jump location information, and a jump time. When the jump target video is not the first video, the jump information also includes a playing address of a second video, and may also include jump video prompt information, and the like.

It should be noted that, the jump information is an example of a collection, and the video frame identifier, the jump location information, the jump time and other information may be included in the jump information, may appear in the form of a collection, or not appear in the form of a collection. This is not limited in the embodiments of the present invention. The first video is an example of a name, and is used to represent a video currently being played; the jump target video is a video played after jump, may be the first video or another video. The second video is also an example of a name, and is used to represent another video different from the first video.

The video processing device may make the jump information, and the specific method includes:

201. Add an auxiliary tool before a video is recorded, where the video is a first video or a jump target video.

Before the video is recorded, a shooting location path of a recording camera and a duration of a shooting location are planned. The auxiliary tool is added on the shooting location, to obtain jump location information during subsequent processing of the video. Optionally, a method for adding the auxiliary tool may be adding a positioning tool, for example, a high-precision GPS locator and a gyroscope, on shooting locations of the first video and the jump target video. The positioning tool may regularly generate an identifier of a video frame photographed by the camera and location information of a corresponding shooting location. Optionally, a method for adding the auxiliary tool may alternatively be placing an auxiliary easy for program recognition, for example, an auxiliary with a specific shape or a specific color, at a location at which jump information needs to be set. A plurality of pieces of jump information may be set in one video image. Therefore, an auxiliary easy for differentiation such as a red triangle pyramid, a yellow triangle pyramid or the like may be placed, to distinguish between different jump information during subsequent processing of the video.

202. After the video is recorded, the video processing device obtains a jump time of the jump target video.

After the video is recorded, the jump time of the jump target video is recorded, and the jump time is a starting time point for playing the jump target video after the jump to the jump target video. Optionally, jump video prompt information may be generated according to video content starting to be played at the jump time of the jump target video. The jump video prompt information is used to prompt, to the user, the video content after jump, so that the user selects, according to interest and preferences of the user, whether to perform video jump. The jump video prompt information may be video image information, or text description information for the video content.

When the jump target video is still the first video, the jump time is another playing time point of the first video; and when the jump target video is not the first video, that is, a jump to the second video is required for playing, the jump time is a playing time point of the second video. It should be noted that, in the embodiments of the present invention, jump may be performed between a plurality of time points in a plurality of videos. The present invention makes descriptions by using a jump time of jump in the first video to the jump target video, and this does not constitute a limitation to the embodiments of the present invention.

203. The video processing device obtains a video frame identifier of a video image in the first video, and jump location information in the video image according to the auxiliary tool.

When the auxiliary tool added in step 201 is a positioning tool, the video frame identifier of the first video image and the corresponding location information of a first shooting location that are generated when the camera records the first video, or the video frame identifier of the second video image and the corresponding location information of a target shooting location that are generated when the camera records the jump target video may be obtained by using the positioning tool. The jump location information may be obtained by processing the location information of the first shooting location and the location information of the target shooting location. For example, relative location information obtained by performing a subtraction operation on the two pieces of location information may be the jump location information. The video frame identifier of the first video image and the corresponding jump location information are recorded. The second video image may be a video image corresponding to the jump time of the jump from the first video image of the first video to the jump target video.

When the auxiliary tool added in step 201 is an auxiliary easy for program recognition, a feature image is extracted according to a feature of the auxiliary, and then the feature image is recognized from the first video image of the first video by using an image recognition program; then location information of the feature image in the first video image, that is, the corresponding jump location information, is calculated, and the video frame identifier of the first video image is also recorded.

204. The video processing device matches the video frame identifier, the jump location information, and the jump time of the jump target video, to generate jump information.

The video frame identifier and the corresponding jump location information may be matched when recorded in step 203. Then the video frame identifier and the corresponding jump location information are matched with the jump time of the jump target video. The matching herein involves considering a jump from location information of one frame of video image of the first video to a jump time of a jump target video for continuing playing. Optionally, the second video image is related to video content at the jump location information of the first video image. For example, video content at jump location information (x1, y1, z1) in an $M^{th}$ frame of video image in the first video is a door, and an exhibition hall entering from the door is a calligraphy and painting exhibition hall. A video scene played at a jump time t of a jump target video is the calligraphy and painting exhibition hall, so that the video frame identifier of the $M^{th}$ frame of video image of the first video, the corresponding jump location information (x1, y1, z1), and the jump time t of the jump target video can be matched, to generate the jump information.

The jump information is stored together with the first video after being generated. There are a plurality of methods for storage. One method may be storing each piece of jump information together with video image data corresponding to a video frame identifier in each piece of jump information, or storing all jump information in the first video and the video data of the first video as two associated data files. It should be noted that, in this embodiment of the present invention, a stored file is described by using the jump information and the first video. The file may be a file obtained by combining the jump information and the first video data, or two files associated with each other. This is not limited in the embodiments of the present invention.

Figure 3:
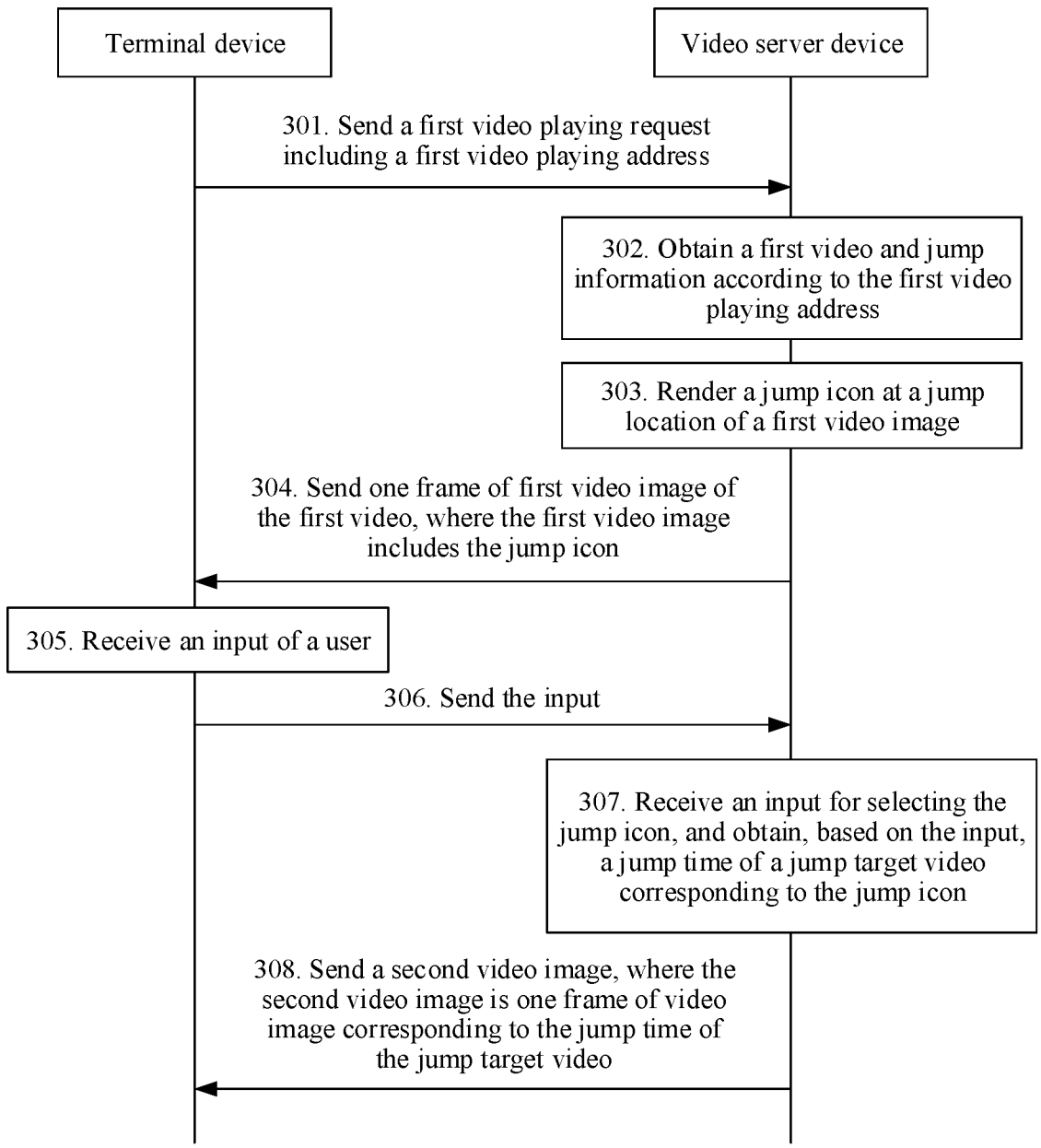
FIG. 3 is a schematic flowchart of a method for controlling VR video playing according to an embodiment of the present invention.

FIG. 3 is a schematic flowchart of a method for controlling VR video playing according to an embodiment of the present invention. In this embodiment of the present invention, a video server device plays a video image of a first video to a terminal device, where a jump icon is included at a jump location of the video image; when a user selects the jump icon, the video server device obtains a jump time of a target jump video corresponding to the jump icon, and plays the target jump video starting from the jump time to the terminal device. The method includes:

301. The terminal device sends a first video playing request including a first video playing address to the video server device.

The user demands the first video through the terminal device, and after receiving an input, the terminal device sends the first video playing request to the video server device.

302. The video server device obtains the first video and jump information according to the first video playing address.

The video server device receives the first video playing request sent by the terminal device, and obtains the first video and the jump information according to the first video playing address in the first video playing request. Optionally, the first video and the jump information are stored in the video server device, and can be directly obtained by the video server device. For example, a video processing device uploads the first video and the jump information that are processed into the video server device. Optionally, the first video and the jump information are not in the video server device, and the video server device requests another device for related resources according to the address.

303. The video server device renders a jump icon at a jump location of a first video image.

It can be learned from step 204 in the embodiment shown in FIG. 2 that, the first video and the jump information that are obtained by the video server device may be a combined file, or two files associated with each other. The video server device parses the obtained first video and jump information into video frame data and jump information data. The video server device performs rendering according to the video frame data and the jump information, to generate a video image. The video image includes the jump icon.

The first video image is one frame of video image in the first video. The jump information of the first video image includes a video frame identifier, and the first video image may be associated with the jump information according to the video frame identifier. It may be understood that, the first video image is one frame of video image corresponding to the video frame identifier. The jump information of the first video image further includes jump location information, and the jump icon may be rendered at the jump location of the first video image according to the jump location information. Optionally, the jump information may further include jump video prompt information, and the jump video prompt information may further be rendered at the jump location of the first video image according to the jump location information.

For example, the first video image is an $n^{th}$ frame of video image, and a video frame identifier of the $n^{th}$ frame of video image may have a plurality of pieces of corresponding jump information, and description is provided by using an example that the video frame identifier has one piece of jump information. It should be understood that, when there are a plurality of pieces of jump information, methods for processing other jump information are the same. First, corresponding jump information is obtained according to a video frame identifier of an $n^{th}$ frame of video image, and jump location information, such as three-dimensional coordinates (x, y, z), is obtained according to the jump information. Optionally, jump video prompt information may also be obtained. Refer to step 202 in the embodiment shown in FIG. 2 for explanation of the jump video prompt information, for example, information about the calligraphy and painting exhibition hall. The video server device renders to generate an $n^{th}$ frame of video image according to information such as video frame data and a user viewing angle, and renders the jump icon, such as a small arrow, at a corresponding jump location (x, y, z) in the $n^{th}$ frame of video image, to prompt to the user that interaction can be performed herein to perform video jump. Optionally, the video server device may also render the jump video prompt information at a corresponding jump location (x, y, z) in the $n^{th}$ frame of video image. Optionally, the jump video prompt information may alternatively be used as the jump icon.

304. The video server device sends one frame of first video image of the first video to the terminal device, where the first video image includes a jump icon.

The video server device displays the first video image to the user through a display of the terminal device, where the first video image includes the jump icon. Optionally, the first video image includes jump video prompt information. Optionally, the video server device may set an animation for the jump icon, for example, make the jump icon jump, or highlight the jump icon, to better prompt the user that interaction can be performed herein to perform video jump. It should be understood that, when playing the video through the terminal device, the video server device may send video images frame by frame to the terminal device or send a plurality of frames of video images to the terminal device, and regardless of the form in which the video server device sends the video data to the terminal device, it can be understood that the video server device sends the video data to the terminal device in a form of sending a video stream. In this embodiment of the present invention, that the video server device sends one frame of video image to the terminal device is illustrated from the perspective of video display, and may include the foregoing specific sending forms.

305. The terminal device receives an input of the user.

The user may select, based on preferences of the user, the jump icon in the first video image, to jump to a corresponding video scene for playing. The jump icon is in the video image, and the user may perform video jump based on video content in the video image, particularly video content at which the jump icon is located. There may be many ways for the user to select the jump icon to form an input. For example, the user selects the jump icon through a VR control device such as an air mouse, a ray gun, or a handle, to form the input, or forms the input through staring at the jump icon. The terminal device receives the input of the user, and obtains input location information of the input. The input location information may be a posture of a VR control device, or a location of an input of the VR control device in a video image displayed on the terminal device, or a location (such as coordinates) of a staring sight line of the user in the video image displayed on the terminal device.

It should be noted that, when the video server device plays a video, if no user input is received, the VR video is normally played. This is not limited in this embodiment of the present invention.

306. The terminal device sends an input to the video server device.

The terminal device sends the input to the video server device. Specifically, the terminal device sends input location information of the input to the video server device. Optionally, the terminal device may also send a video frame identifier of the input to the video server device, where the video frame identifier of the input is a video frame identifier corresponding to a third video image being displayed by the terminal device when the user clicks to form the input. The third video image may be the same frame of video image as the first video image, or two frames of video images with the same or similar video image content.

307. The video server device receives an input used for selecting the jump icon, and obtains, based on the input, a jump time of a jump target video corresponding to the jump icon.

The video server device receives the input sent by the terminal device. Specifically, the video server device may receive the input location information of the input, and determines, based on the input location information, that the input selects the jump icon. The specific method includes:

Optionally, the video image that is with a jump icon displayed by the terminal device and that is seen by the user may be the first video image. When the user selects, based on the video content, preferences of the user, or the jump video prompt information after consideration, the jump icon to form the input in the terminal device, the terminal device may currently display the third video image. The terminal device receives the input of the user and sends the input location information to the video server device. When the video server device receives the input location information, the video image being processed may be a fourth video image. It should be noted that, the first video image, the third video image, and the fourth video image may be the same frame of video image (scene 1), or several frames of video images with the same or similar video content of the video image (scene 2), or there may be a case in which content of video images greatly differs due to a time point of shot cut (scene 3).

Optionally, for the scene 1, the video server device generates relative location information of the fourth video image according to the received input location information, and the relative location information may be coordinate information obtained through conversion to coordinate axes of the fourth video image. The video server device compares the relative location information with jump location information in jump information of the fourth video image. If a distance difference between the two pieces of location information is beyond an acceptable range, it indicates that the user fails to click an effective interaction region, and this may be caused by a misoperation of the user. The video server device may make no interactive response, and continues playing the video, or provide a prompt that the jump icon is not selected. If the distance difference between the two pieces of location information is within the acceptable range, the video server device determines that the input of the user selects a jump icon corresponding to the jump information, and obtains the jump information, to obtain a jump time of the jump target video therein. Optionally, when the jump target video is a second video, that is, when a jump to the second video different from the first video being played is required, the video server device may also obtain a playing address of the second video.

It should be understood that, the acceptable range indicates a range in which a jump icon may interact with the user in the video image. It should be noted that, when there are a plurality of pieces of jump information in the fourth video image, the jump information selected by the user may alternatively be determined through jump location information therein.

Optionally, for the scene 2, from the perspective of the user, video jumps indicated by the jump icons of the first video image, the third video image, and the fourth video image are the same, and the jump icons may be considered the same. In addition, from the perspective of the video server device, the jump target videos and jump times in the jump information of the first video image, the third video image, and the fourth video image are the same, then the jump information corresponding to the jump icons of the first video image and the third video image may alternatively be jump information of the fourth video image, and the video server device can still perform an operation according to the method of scene 1.

Optionally, for the scene 3, the video jumps indicated by the jump icons of the first video image, the third video image, and the fourth video image are different, then the jump icon selected by the user cannot correspond to the jump information of the fourth video image. The video server device cannot find corresponding jump information in the third video image, and may make no interactive response, and continues playing the video, or provides a prompt that the jump icon is not selected.

Optionally, for the foregoing three scenes, when the terminal device further sends the video frame identifier in step 306, the video server device finds the corresponding third video image according to the video frame identifier, and then obtains jump information based on the input location information, to obtain the jump time of the jump target video. Specifically, the video server device generates relative location information of the third video image according to the received input location information, and the relative location information may be coordinate information obtained through conversion to corresponding coordinate axes. The video server device compares the relative location information with jump location information in jump information of the third video image. If a distance difference between the two pieces of location information is beyond an acceptable range, it indicates that the user fails to click an effective interaction region, and this may be caused by a misoperation of the user. The video server device may make no interactive response. If the distance difference between the two pieces of location information is within the acceptable range, the video server device determines that the input of the user selects a jump icon corresponding to the jump information, and obtains the jump information, to obtain a jump time of the jump target video therein. Optionally, when the jump target video is a second video, that is, when it is necessary to jump to the second video, the video server device may also obtain a playing address of the second video.

It should be noted that, the possibility of the occurrence of the scene 3 is extremely small. The jump icon is used to prompt the user to perform video jump, the user needs to be provided with time for finding the jump icon, and the user also needs to be provided with time for considering whether to perform video jump. Therefore, jump icons of a plurality of adjacent frames of video images are the same. The processing method of the video server device in the scene 1 and scene 2 may implement interaction with the user based on video content.

308. The video server device sends a second video image to the terminal device, where the second video image is one frame of video image corresponding to the jump time of the jump target video.

Based on the jump time obtained in step 307, the video server device may obtain data of the video image corresponding to the jump time, and renders to generate the second video image. It should be understood that, when the second video image has jump information, a corresponding jump icon is rendered in the second video image, and the subsequent method for controlling VR video playing is the same as the method from step 304 to step 308.

When a jump to the second video is required, that is, when the jump information obtained based on the input in step 307 includes a playing address of the second video, the video server device may obtain the second video based on the playing address of the second video. Optionally, jump information of the second video may also be obtained. Based on the jump time obtained in step 307, the video server device may also determine a second video image corresponding to a jump time of the second video. Specifically, the video server device renders to generate the second video image. When the second video image has corresponding jump information, a jump icon is further rendered in the second video image. The subsequent method for controlling VR video playing is the same as the method from step 304 to step 308.

Optionally, video content of the second video image is related to video content at the jump icon of the first video image. It can be learned from the method in step 204 in the embodiment shown in FIG. 2 that, the second video image played from the jump time of the jump target video is related to the video content at the jump location information in the first video image of the first video, that is, related to the video content at the jump icon in the first video image.

It should be understood that, in the embodiments of the present invention, the first video image, the second video image, the first video, and the second video are examples of names for clearly illustrating the technical solutions, and do not constitute a limitation on the embodiments of the present invention.

In the method for controlling VR video playing provided in this embodiment of the present invention, the VR video image includes the jump icon, so that when a user watches a video, the user may be prompted that video jump may be performed at the jump icon. The user can quickly jump to another scene in which the user is interested by selecting the jump icon based on the watched video content and interest and preferences of the user. The method provides personalized services for the user, forms watching interaction with the user, and improves user experience of the VR video.

Figure 4:
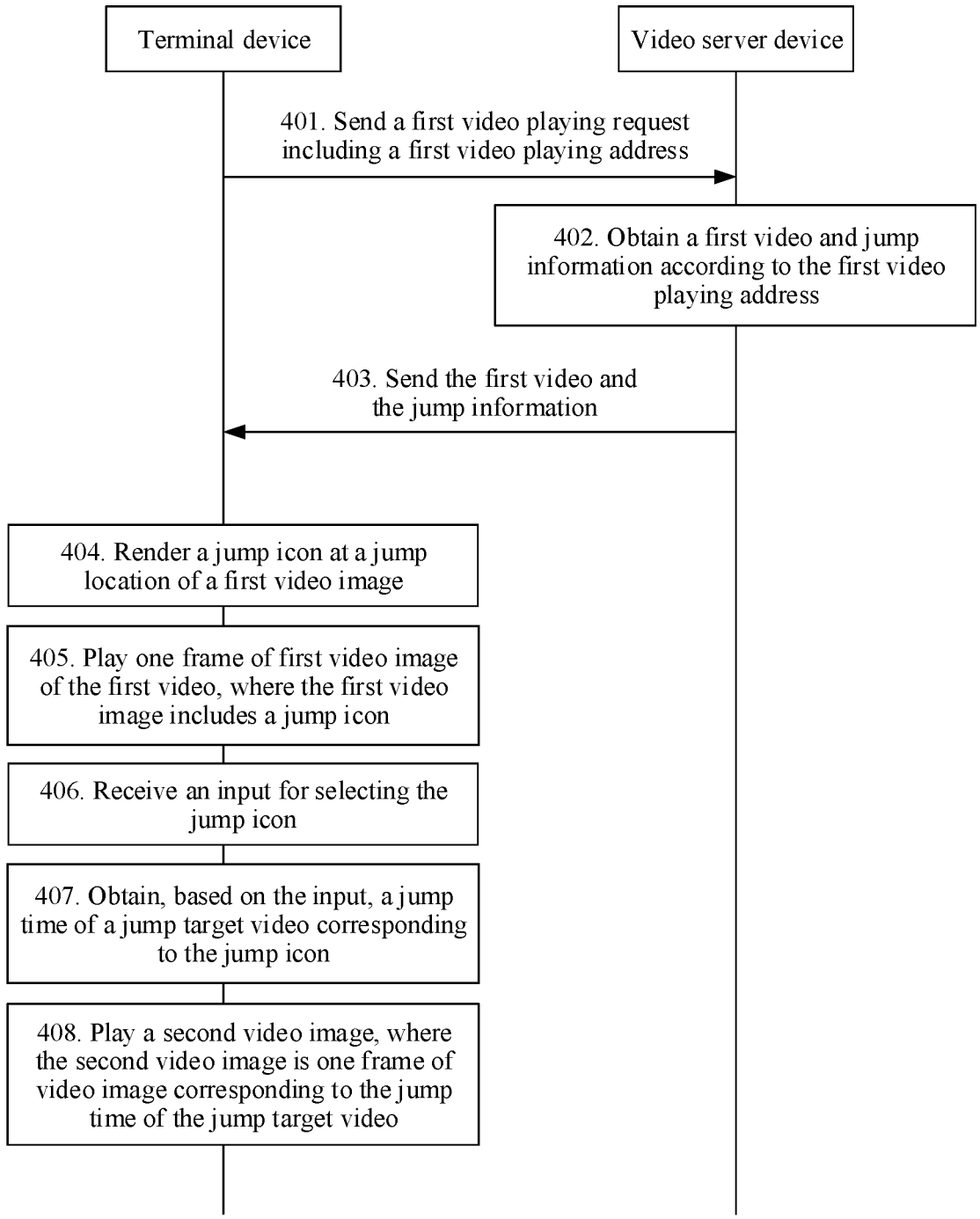
FIG. 4 is a schematic flowchart of another method for controlling VR video playing according to an embodiment of the present invention.

FIG. 4 is a schematic flowchart of another method for controlling VR video playing according to an embodiment of the present invention. In this embodiment of the present invention, a terminal device plays a video image of a first video, where a jump icon is included at a jump location of the video image; when a user selects the jump icon, the terminal device obtains a jump time of a target jump video corresponding to the jump icon, and plays the target jump video from the jump time. Steps 401 and 402 are the same as steps 301 and 302 in the embodiment shown in FIG. 3. Details are not described herein again. The method further includes:

403. The video server device sends the first video and jump information to the terminal device.

In the embodiment of FIG. 4, the terminal device controls VR video playing, and therefore, the video server device sends the first video and the jump information to the terminal device. It should be noted that, the first video and the jump information may be stored in the terminal device, or in a storage device such as a DVD or a hard disk. Then, the terminal device may not perform steps 401 to 403, and the terminal device directly obtains the first video and the jump information.

404. The terminal device renders a jump icon at a jump location of a first video image.

The specific method of step 404 is the same as step 303 in the embodiment shown in FIG. 3, and the difference lies only in that the execution body of the method changes from the video server device to the terminal device. It can be learned from step 204 in the embodiment shown in FIG. 2 that, the first video and the jump information that are obtained by the terminal device may be a combined file, or two files associated with each other. The terminal device parses the obtained first video and jump information into video frame data and jump information data. The terminal device performs rendering according to the video frame data and the jump information data, to generate a video image. The video image includes the jump icon.

The first video image is one frame of video image in the first video. The jump information of the first video image includes a video frame identifier, and the first video image may be associated with the jump information according to the video frame identifier. It may be understood that, the first video image is one frame of video image corresponding to the video frame identifier. The jump information of the first video image further includes jump location information, and the jump icon may be rendered at the jump location of the first video image according to the jump location information. Optionally, the jump information may further include jump video prompt information, and the jump video prompt information may further be rendered at the jump location of the first video image according to the jump location information.

For example, the first video image is an $n^{th}$ frame of video image, and a video frame identifier of the $n^{th}$ frame of video image may have a plurality of pieces of corresponding jump information, and description is provided by using an example that the video frame identifier has one piece of jump information. It should be understood that, when there are a plurality of pieces of jump information, methods for processing other jump information are the same. First, corresponding jump information is obtained according to a video frame identifier of an $n^{th}$ frame of video image, and jump location information, such as three-dimensional coordinates (x, y, z), is obtained according to the jump information. Optionally, jump video prompt information may also be obtained. Refer to step 202 in the embodiment shown in FIG. 2 for explanation of the jump video prompt information, for example, information about the calligraphy and painting exhibition hall. The terminal device renders to generate an $n^{th}$ frame of video image according to information such as video frame data and a user viewing angle, and renders the jump icon, such as a small arrow, at a corresponding jump location (x, y, z) in the $n^{th}$ frame of video image, to prompt to the user that interaction can be performed herein to perform video jump. Optionally, the terminal device may also render the jump video prompt information at a corresponding jump location (x, y, z) in the $n^{th}$ frame of video image. Optionally, the jump video prompt information is used as the jump icon.

405. The terminal device plays one frame of first video image of the first video, where the first video image includes a jump icon.

The terminal device displays the first video image to the user through a display, where the first video image includes the jump icon. Optionally, the first video image may further include jump video prompt information. Optionally, the terminal device may set an animation for the jump icon, for example, make the jump icon jump, or highlight the jump icon, to better prompt the user that interaction can be performed herein to perform video jump.

406. The terminal device receives an input used for selecting the jump icon.

The user may click, based on preferences of the user, the jump icon in the first video image, to jump to a corresponding video scene for playing. The jump icon is in the video image, and the user may perform video jump based on video content in the video image, particularly video content at which the jump icon is located. There may be many ways for the user to select the jump icon to form an input. For example, the user selects the jump icon through a VR control device such as an air mouse, a ray gun, or a handle, to form the input, or forms the input through staring at the jump icon. The terminal device receives the input of the user, and obtains input location information of the input. The input location information may be a posture of a VR control device, or a location of an input of the VR control device in a video image displayed on the terminal device, or a location (such as coordinates) of a staring sight line of the user in the video image displayed on the terminal device.

The video image that is with a jump icon displayed by the terminal device and that is seen by the user may be the first video image. When the user selects, based on the video content, preferences of the user, or the jump video prompt information after consideration, the jump icon to form the input in the terminal device, the terminal device may currently display a third video image. It should be noted that, the first video image and the third video image may be the same frame of video image (scene 1), or two frames of video images with the same or similar video content of the video image (scene 2), or there may be a case in which content of video images greatly differs due to a time point of shot cut (scene 3).

Optionally, for the scene 1, the terminal device generates relative location information of the third video image according to the received input location information, and the relative location information may be coordinate information obtained through conversion to coordinate axes of the third video image. The terminal device compares the relative location information with jump location information in jump information of the third video image. If a distance difference between the two pieces of location information is beyond an acceptable range, it indicates that the user fails to click an effective interaction region, and this may be caused by a misoperation of the user. The terminal device may make no interactive response, and continues playing the video, or provide a prompt that the jump icon is not selected. If the distance difference between the two pieces of location information is within the acceptable range, the terminal device determines that the input of the user selects a jump icon corresponding to the jump information.

It should be understood that, the acceptable range indicates a range in which a jump icon may interact with the user in the video image. It should be noted that, when there are a plurality of pieces of jump information in the third video image, the jump information selected by the user may alternatively be determined through jump location information therein.

Optionally, for the scene 2, from the perspective of the user, video jumps indicated by the jump icons of the first video image and the third video image are the same, and the jump icons may be considered the same. In addition, from the perspective of the terminal device, the jump target videos and jump times in the jump information of the first video image and the third video image are the same, then the jump information corresponding to the jump icon of the first video image may alternatively be jump information of the third video image, and the terminal device can still determine, according to the method of the scene 1, whether the input of the user selects the jump icon.

Optionally, for the scene 3, the video jumps indicated by the jump icons of the first video image and the third video image are different, then the jump icon selected by the user cannot correspond to the jump information of the third video image. The terminal device cannot find corresponding jump information in the third video image, and may make no interactive response, and continues playing the video, or provides a prompt that the jump icon is not selected.

It should be noted that, the possibility of the occurrence of the scene 3 is extremely small. The jump icon is used to prompt the user to perform video jump, the user needs to be provided with time for finding the jump icon, and the user also needs to be provided with time for considering whether to perform video jump. Therefore, jump icons of a plurality of adjacent frames of video images are the same. The method performed by the terminal device in the scene 1 and scene 2 may implement interaction with the user based on video content.

When the terminal device plays a video, if no user input is received, the VR video is normally played. This is not limited in this embodiment of the present invention.

407. The terminal device obtains, based on the input, a jump time of a jump target video corresponding to the jump icon.

After the terminal device determines that the input of the user selects the jump icon in step 406, the jump information may be obtained, to obtain the jump time of the jump target video therein. Optionally, when the jump target video is a second video, that is, when a jump to the second video different from the first video being played is required, the terminal device may also obtain a playing address of the second video.

408. The terminal device plays a second video image, where the second video image is one frame of video image corresponding to the jump time of the jump target video.

Based on the jump time obtained in step 407, the terminal device may obtain data of the video image corresponding to the jump time, and renders to generate the second video image. It should be understood that, when the second video image has jump information, a corresponding jump icon is rendered in the second video image, and the subsequent method for controlling VR video playing is the same as the method from step 405 to step 408.

When a jump to the second video is required, that is, when the jump information obtained based on the input in step 407 includes a playing address of the second video, the terminal device may obtain the second video based on the playing address of the second video. Optionally, jump information of the second video may also be obtained. Based on the jump time obtained in step 407, the terminal server device may also determine a second video image corresponding to a jump time of the second video. Specifically, the terminal device renders to generate the second video image. When the second video image has corresponding jump information, a jump icon is further rendered in the second video image. The subsequent method for controlling VR video playing is the same as the method from step 405 to step 408.

Optionally, video content of the second video image is related to video content at the jump icon of the first video image. It can be learned from the method in step 204 in the embodiment shown in FIG. 2 that, the second video image played from the jump time of the jump target video is related to the video content at the jump location information in the first video image of the first video, that is, related to the video content at the jump icon in the first video image.

It should be understood that, in the embodiments of the present invention, the first video image, the second video image, the first video, and the second video are examples of names for clearly illustrating the technical solutions, and do not constitute a limitation on the embodiments of the present invention.

Compared with the embodiment shown in FIG. 3, the method for controlling VR video playing provided in this embodiment of the present invention is a method performed by the terminal device for controlling VR video playing. The method in this embodiment of the present invention reduces a latency of video jump based on the embodiment shown in FIG. 3, and improves watching interactive experience of the user.

Figure 5:
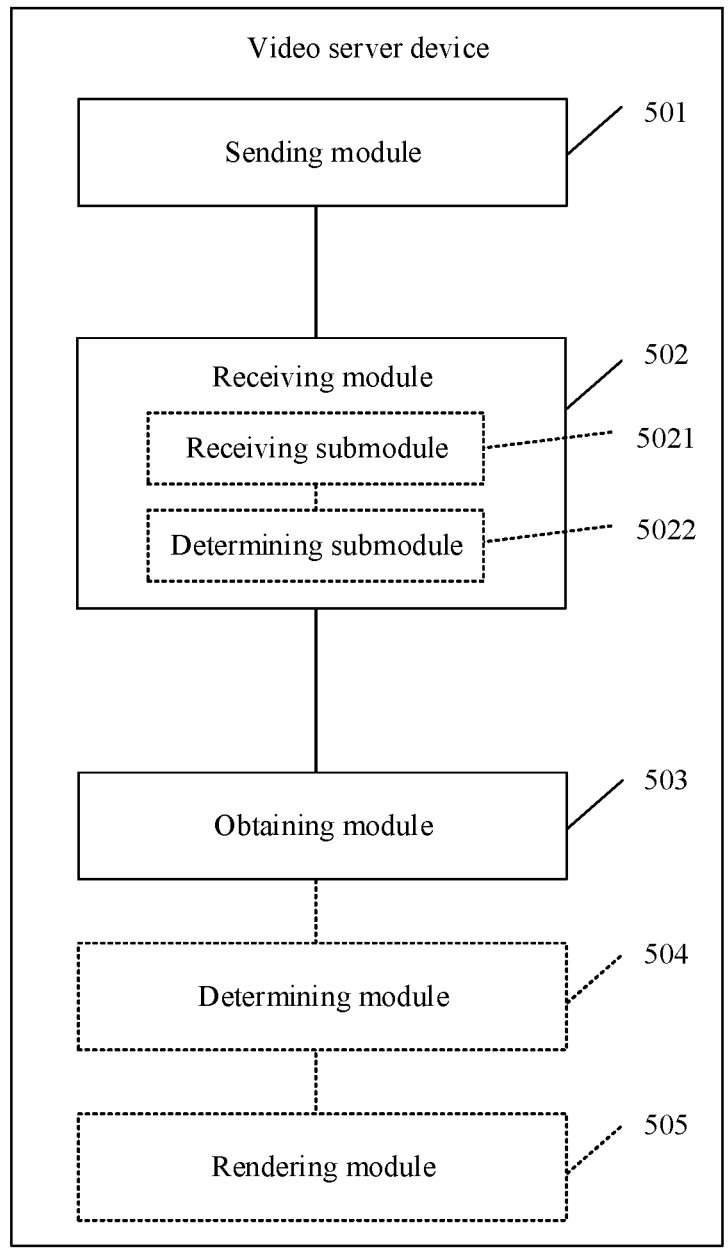
FIG. 5 is a schematic composition diagram of a video server device according to an embodiment of the present invention.

FIG. 5 is a schematic composition diagram of a video server device according to an embodiment of the present invention. The video server device includes:

a sending module 501, configured to send one frame of first video image of a first video to a terminal device, where the first video image includes a jump icon, and the first video is a video being played by the video server device for the terminal device; and refer to the descriptions of the steps in the embodiment shown in FIG. 3, such as step 304, for a specific execution process;

a receiving module 502, configured to receive an input sent by the terminal device for selecting the jump icon, where refer to the descriptions of the steps in the embodiment shown in FIG. 3, such as steps 305 to 307, for a specific execution process; and specifically, the receiving module 502 may include: a receiving submodule 5021, configured to receive input location information of the input sent by the terminal device, and a determining submodule 5022, configured to determine, based on the input location information, that the input selects the jump icon, and refer to the descriptions of the steps in the embodiment shown in FIG. 3, such as step 307, for a specific execution process.

an obtaining module 503, configured to obtain, based on the input, a jump time of a jump target video corresponding to the jump icon, where refer to the descriptions of the steps in the embodiment shown in FIG. 3, such as step 307, for a specific execution process; and the sending module 501, further configured to send a second video image to the terminal device, where the second video image is one frame of video image corresponding to the jump time of the jump target video, and refer to the descriptions of the steps in the embodiment shown in FIG. 3, such as step 308, for a specific execution process.

Specifically, the jump target video is the first video, and the second video image is one frame of video image corresponding to the jump time of the first video. To be specific, video jump is performed in the first video being watched. Refer to the descriptions of the steps in the embodiment shown in FIG. 3, such as step 308, for a specific execution process.

Specifically, the jump target video is a second video, and the second video image is one frame of video image corresponding to a jump time of the second video. The obtaining module 503 is further configured to obtain, based on the input, a playing address of the second video corresponding to the jump icon. The video server device further includes a determining module 504, configured to determine the second video image based on the playing address of the second video and the jump time of the second video. That is, a jump to the second video different from the first video being played is made, to continue playing the video. Refer to the descriptions of the steps in the embodiment shown in FIG. 3, such as step 308, for a specific execution process.

Optionally, video content of the second video image is related to video content at the jump icon of the first video image. Refer to the descriptions of the steps in the embodiment shown in FIG. 3, such as step 308, for specific content.

Optionally, the video server device further includes: a rendering module 505, configured to render the jump icon at the jump location of the first video image, where the first video image is a video image corresponding to a video frame identifier in the first video. Refer to the descriptions of the steps in the embodiment shown in FIG. 3, such as step 303, for specific content.

Optionally, the rendering module 505 is further configured to render jump video prompt information at the jump location of the first video image. The jump video prompt information is used to prompt, to the user, video content after jump, and the jump video prompt information may be video image information, or text description information for the video content. Refer to the descriptions of the steps in the embodiment shown in FIG. 3, such as step 303, for specific content.

The video server device provided in this embodiment of the present invention can be used in a method for controlling VR video playing. Therefore, refer to the foregoing method embodiment for technical effects that can be achieved in this embodiment of the present invention. Details are not described herein again.

Figure 6:
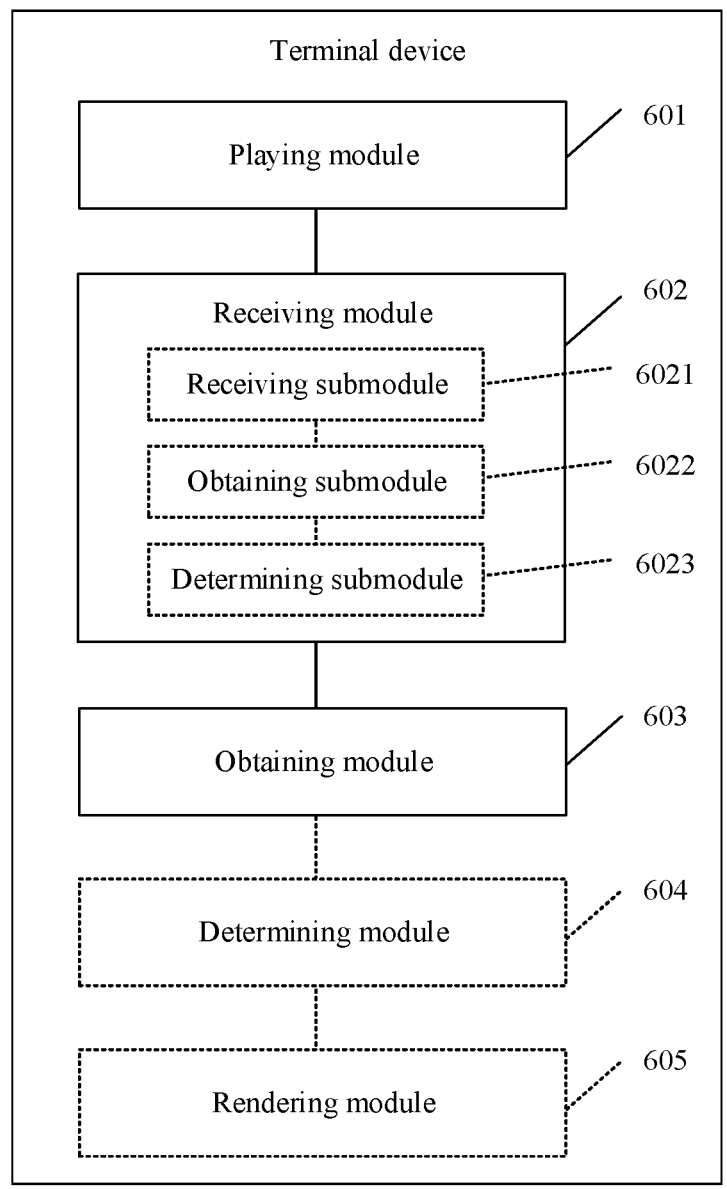
FIG. 6 is a schematic composition diagram of a terminal device according to an embodiment of the present invention.

FIG. 6 is a schematic composition diagram of a terminal device according to an embodiment of the present invention. The terminal device includes:

a playing module 601, configured to play one frame of first video image of a first video, where the first video image includes a jump icon; the first video is a video being played by the terminal device; and refer to the descriptions of the steps in the embodiment shown in FIG. 4, such as step 405, for a specific execution process;

a receiving module 602, configured to receive an input used for selecting the jump icon, where refer to the descriptions of the steps in the embodiment shown in FIG. 4, such as step 406, for a specific execution process; and The receiving module 602 specifically includes: a receiving submodule 6021, configured to receive the input; an obtaining submodule 6022, configured to obtain input location information of the input in the first video image, and a determining submodule 6023, configured to determine, based on the input location information, that the input selects the jump icon; and refer to the descriptions of the steps in the embodiment shown in FIG. 4, such as step 406, for a specific execution process;

an obtaining module 603, configured to obtain, based on the input, a jump time of a jump target video corresponding to the jump icon, where refer to the descriptions of the steps in the embodiment shown in FIG. 4, such as step 407, for a specific execution process; and the playing module 601, further configured to play a second video image, where the second video image is one frame of video image corresponding to the jump time of the jump target video, where refer to the descriptions of the steps in the embodiment shown in FIG. 4, such as step 408, for a specific execution process.

Specifically, the jump target video is the first video, and the second video image is one frame of video image corresponding to the jump time of the first video. To be specific, video jump is performed in the first video being watched. Refer to the descriptions of the steps in the embodiment shown in FIG. 4, such as step 408, for a specific execution process.

Specifically, the jump target video is a second video, the second video image is one frame of video image corresponding to a jump time of the second video. The obtaining module 603 is configured to obtain, based on the input, a playing address of the second video corresponding to the jump icon. The terminal device further includes a determining module 604, configured to determine the second video image based on the playing address of the second video and the jump time of the second video. That is, a jump to the second video different from the first video being played is made, to continue playing the video. Refer to the descriptions of the steps in the embodiment shown in FIG. 4, such as step 408, for a specific execution process.

Optionally, the video content of the second video image is related to the video content at the jump icon of the first video image. Refer to the descriptions of the steps in the embodiment shown in FIG. 4, such as step 408, for a specific execution process.

Optionally, the terminal device further includes a rendering module 605, configured to render the jump icon at a jump location of the first video image, where the first video image is one frame of video image corresponding to a video frame identifier in the first video. Refer to the descriptions of the steps in the embodiment shown in FIG. 4, such as step 404, for a specific execution process.

Optionally, the rendering module 605 is further configured to render jump video prompt information at the jump location of the first video image. The jump video prompt information is used to prompt, to the user, video content after jump, and the jump video prompt information may be video image information, or text description information for the video content. Refer to the descriptions of the steps in the embodiment shown in FIG. 4, such as step 404, for a specific execution process.

The terminal device provided in this embodiment of the present invention can be used in a method for controlling VR video playing. Therefore, refer to the foregoing method embodiment for technical effects that can be achieved in this embodiment of the present invention. Details are not described herein again.

Figure 7:
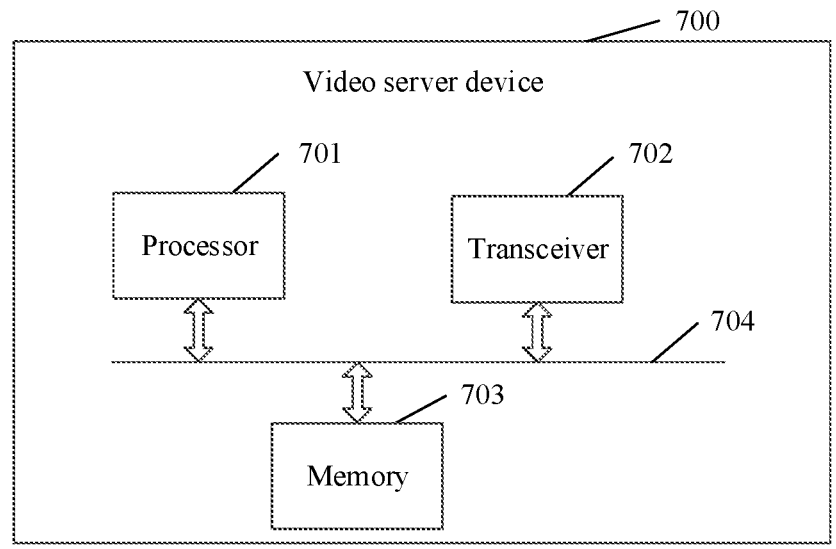
FIG. 7 is another schematic composition diagram of a video server device according to an embodiment of the present invention.

FIG. 7 is another schematic composition diagram of a video server device according to an embodiment of the present invention. At least one processor 701 and at least one transceiver 702 are included. Optionally, a memory 703 may further be included.

The memory 703 may be a volatile memory, such as a random access memory; the memory may also be a non-volatile memory, such as a read-only memory, a flash memory, a hard disk drive (HDD), or a solid-state drive (SSD), or the memory 703 is any other medium that can be configured to carry or store desired program code in a form of instructions or data structures and can be accessed by a computer, but is not limited thereto. The memory 703 may be a combination of the foregoing memories.

In this embodiment of the present invention, a specific connection medium between the processor 701 and the memory 703 is not limited. In this embodiment of the present invention, the memory 703 and the processor 701 are connected by using a bus 704 in the figure. The bus 704 is represented by using a bold line in the figure. A connection manner between other components is merely an example for description, and is not limited thereto. The bus 704 may be classified into an address bus, a data bus, a control bus, and the like. For ease of illustration, only one thick line is used to represent the bus in FIG. 7, but this does not mean that there is only one bus or only one type of bus.

The processor 701 may have a data receiving/sending function, and can communicate with another device. For example, in this embodiment of the present invention, the processor 701 may send a video image to a terminal device, or may receive input position information from the terminal device. In the video server device shown in FIG. 7, an independent data transceiver module, for example, the transceiver 702, may also be disposed to receive and send data. When communicating with another device, the processor 701 may also transmit data by using the transceiver 702. For example, in this embodiment of the present invention, the processor 701 may send a video image to the terminal device by using the transceiver 702, or may receive input position information from the terminal device by using the transceiver 702.

The processor 701 may have a video image rendering function. For example, the processor may render a jump icon in a video image. The processor 701 may also display a video image to a user by using the terminal device, where the video image includes a jump icon. The processor 701 may further read a jump time in the memory 703, and perform corresponding video jump.

In an implementation, it may be considered that a function of the transceiver 702 is implemented by using a transceiver circuit or a dedicated chip for transceiving. It may be considered that the processor 701 is implemented by using a dedicated processing chip, a processing circuit, a processor, or a universal chip. For example, the processor 701 may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

In another implementation, it may be considered that the video server device provided in this embodiment of the present invention is implemented by using a general-purpose computer. To be specific, program code for implementing functions of the processor 701 and the transceiver 702 is stored in the memory 703. The general-purpose processor implements the functions of the processor 701 and the transceiver 702 by executing the code in the memory 703.

When the video server device uses a form shown in FIG. 7, the processor 701 in FIG. 7 may invoke a computer-executable instruction stored in the memory 702, so that the video server device can perform the method performed by the video server device in the foregoing method embodiment. For specific steps, refer to descriptions in the foregoing method or another embodiment. Details are not described herein again.

It may be clearly understood by a person skilled in the art that, for the purpose of convenient and brief description, for a detailed working process of the foregoing apparatuses and modules, refer to a corresponding process in the foregoing method embodiment, and details are not described herein again.

Figure 8:
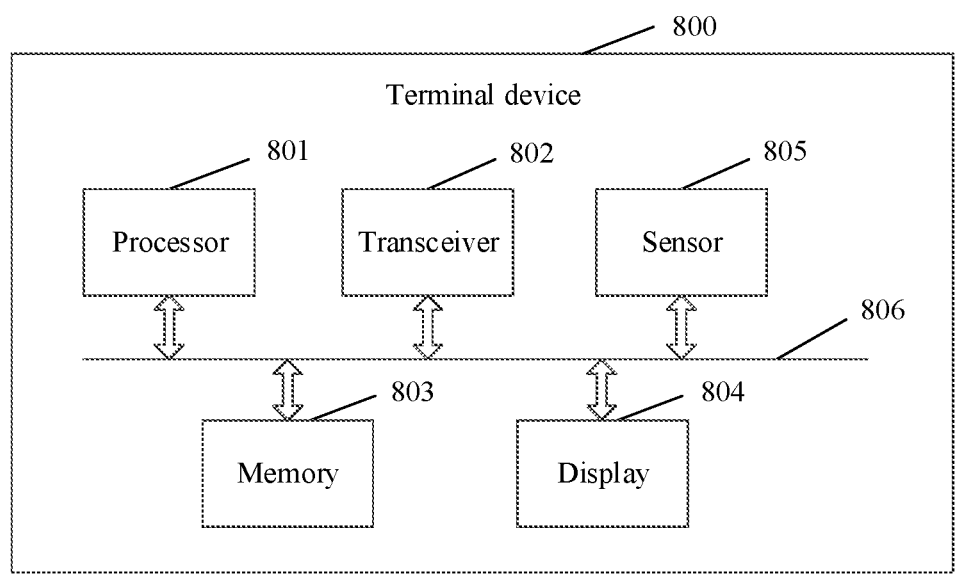
FIG. 8 is another schematic composition diagram of a terminal device according to an embodiment of the present invention.

FIG. 8 is another schematic composition diagram of a terminal device according to an embodiment of the present invention. At least one processor 801 and transceiver 802 are included. Optionally, a memory 803 may further be included.

Optionally, the apparatus 800 may further include a display 804, configured to display a video image to a user, where the video image includes a jump icon. The apparatus may further include a sensor 805, configured to capture a gaze of the user selecting a jump icon or obtain a posture and a position of the terminal device. It should be noted that, the sensor 805 may also be represented by a component with an input function, such as a mouse, an air mouse, a ray gun, or a handle.

The memory 803 may be a volatile memory, such as a random access memory; the memory may also be a non-volatile memory, such as a read-only memory, a flash memory, a hard disk drive (HDD), or a solid-state drive (SSD), or the memory 803 is any other medium that can be configured to carry or store desired program code in a form of instructions or data structures and can be accessed by a computer, but is not limited thereto. The memory 803 may be a combination of the foregoing memories.

In this embodiment of the present invention, a specific connection medium between the processor 801 and the memory 803 is not limited. In this embodiment of the present invention, the memory 803 and the processor 801 are connected by using a bus 806 in the figure. The bus 806 is represented by using a bold line in the figure. A connection manner between other components is merely an example for description, and is not limited thereto. The bus 806 may be classified into an address bus, a data bus, a control bus, and the like. For ease of illustration, only one thick line is used to represent the bus in FIG. 8, but this does not mean that there is only one bus or only one type of bus.

The processor 801 may have a data receiving/sending function, and can communicate with another device. For example, in this embodiment of the present invention, the processor 801 may request video data and jump information from a video server device, and receive data sent by the video server device. In the terminal device shown in FIG. 8, an independent data transceiver module, for example, the transceiver 802, may be disposed, and is configured to receive and send data. When communicating with another device, the processor 801 may also perform data transmission by using the transceiver 802.

The processor 801 may have a video image rendering function. For example, the processor may render a jump icon in a video image. The processor 801 may also control the display 804 to display a video image to a user, where the video image includes a jump icon. The processor 801 may further receive an input from the sensor 805, and obtain input location information. The processor 801 may further read a jump time in the memory 803, and perform corresponding video jump.

In an implementation, it may be considered that a function of the transceiver 802 is implemented by using a transceiver circuit or a dedicated chip for transceiving. It may be considered that the processor 801 is implemented by using a dedicated processing chip, a processing circuit, a processor, or a universal chip. For example, the processor 801 may be a central processing unit ("CPU" for short), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

In another implementation, it may be considered that the terminal device provided in this embodiment of the present invention is implemented by using a general-purpose computer. To be specific, program code for implementing functions of the processor 801 and the transceiver 802 is stored in the memory 803. The general-purpose processor implements the functions of the processor 801 and the transceiver 802 by executing the code in the memory 803.

When the terminal device uses a form shown in FIG. 8, the processor 801 in FIG. 8 may invoke a computer-executable instruction stored in the memory 802, so that the terminal device can perform the method performed by the terminal device in the foregoing method embodiment. For specific steps, refer to descriptions in the foregoing method or another embodiment. Details are not described herein again.

It may be clearly understood by a person skilled in the art that, for the purpose of convenient and brief description, for a detailed working process of the foregoing apparatuses and modules, refer to a corresponding process in the foregoing method embodiment, and details are not described herein again.

Various numbers in embodiments of the present invention are merely for distinguishing for ease of description, and are not intended to limit the scope of the embodiments of the present invention. The sequence numbers of the foregoing processes do not mean execution sequences. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of the present invention.

In the embodiments provided in the present invention, it should be understood that the disclosed system, apparatus, and method may be implemented in other manners. For example, the described apparatus embodiment is merely an example. For example, division into the modules or units is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electric, mechanical, or other forms.

All or some of the foregoing embodiments may be implemented by using software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling virtual reality (VR) video playing, wherein the method is applied to a video server device, and the method comprises:
   sending one frame of a first video image of a first video to a terminal device, wherein the first video image comprises a jump icon;
   receiving an input sent by the terminal device for selecting the jump icon;
   obtaining, based on the input, a jump time of a jump target video associated with the jump icon; and
   sending a second video image to the terminal device, wherein the second video image is one frame of a video image associated with the jump time of the jump target video.

2. The method according to claim 1, wherein receiving the input sent by the terminal device for selecting the jump icon further comprises:
   receiving input location information of the input sent by the terminal device, and
   determining, based on the input location information, that the input selects the jump icon.

3. The method according to claim 1, wherein before sending the first video image to the terminal device, the method further comprises:
   rendering the jump icon at a jump location of the first video image, wherein the first video image is one frame of a video image associated with a video frame identifier in the first video.

4. The method according to claim 1, wherein before sending the first video image to the terminal device, the method further comprises:
   rendering jump video prompt information at a jump location of the first video image, wherein the first video image is one frame of a video image associated with a video frame identifier in the first video.

5. The method according to claim 1, wherein the jump target video is the first video, and the second video image is one frame of a video image associated with the jump time of the first video.

6. The method according to claim 1, wherein the jump target video is a second video, the second video image is one frame of a video image associated with a jump time of the second video, and wherein obtaining, based on the input, the jump time of the jump target video associated with the jump icon further comprises:
   obtaining, based on the input, a playing address of the second video associated with the jump icon; and
   determining the second video image based on the playing address of the second video and the jump time of the second video.

7. A method for controlling virtual reality (VR) video playing, wherein the method is applied to a terminal device and the method comprises:
   playing one frame of a first video image of a first video, wherein the first video image comprises a jump icon;
   receiving an input used for selecting the jump icon;
   obtaining, based on the input, a jump time of a jump target video associated with the jump icon; and
   playing a second video image, wherein the second video image is one frame of a video image associated with the jump time of the jump target video.

8. The method according to claim 7, wherein receiving the input used for selecting the jump icon further comprises:
   receiving the input, and obtaining input location information of the input in the first video image; and
   determining, based on the input location information, that the input selects the jump icon.

9. The method according to claim 7, wherein before playing the first video image, the method further comprises:
   rendering the jump icon at a jump location of the first video image, wherein the first video image is one frame of a video image associated with a video frame identifier in the first video.

10. The method according to claim 7, wherein before playing the first video image, the method further comprises:
    rendering jump video prompt information at a jump location of the first video image, wherein the first video image is one frame of a video image associated with a video frame identifier in the first video.

11. The method according to claim 7, wherein the jump target video is the first video, and the second video image is one frame of a video image associated with the jump time of the first video.

12. The method according to claim 7, wherein the jump target video is a second video, the second video image is one frame of a video image associated with a jump time of the second video, and wherein obtaining, based on the input, the jump time of the jump target video associated with the jump icon further comprises:
    obtaining, based on the input, a playing address of the second video associated with the jump icon; and
    determining the second video image based on the playing address of the second video and the jump time of the second video.

13. A video server device comprising:
    a transceiver, configured to communicate with an apparatus other than the video server device;
    a memory, configured to store a computer executable instruction; and
    one or more processors, connected to the memory and the transceiver through a bus, wherein when the computer executable instruction stored in the memory is executed by the one or more processors, cause the video server device to be configured to perform a method including:

sending one frame of a first video image of a first video to a terminal device, wherein the first video image comprises a jump icon;

receiving an input sent by the terminal device for selecting the jump icon;

obtaining, based on the input, a jump time of a jump target video associated with the jump icon; and sending a second video image to the terminal device, wherein the second video image is one frame of a video image associated with the jump time of the jump target video.

14. The video server device according to claim 13, wherein the video server device is further configured to:

receive input location information of the input sent by the terminal device, and determine, based on the input location information, that the input selects the jump icon.

15. The video server device according to claim 13, wherein the video server device is further configured to:

render the jump icon at a jump location of the first video image, wherein the first video image is one frame of a video image associated with a video frame identifier in the first video.

16. The video server device according to claim 13, wherein the jump target video is a second video, the second video image is one frame of a video image associated with a jump time of the second video;

wherein the video server device is further configured to:

obtain, based on the input, a playing address of the second video associated with the jump icon; and determine the second video image based on the playing address of the second video and the jump time of the second video.

17. A terminal device comprising:

a transceiver, configured to communicate with an apparatus other than the terminal device;

a memory, configured to store a computer executable instruction; and one or more processors, connected to the memory and the transceiver through a bus, wherein when the computer executable instruction stored in the memory is executed by the one or more processors, cause the terminal device to be configured to perform the following method:

playing one frame of a first video image of a first video, wherein the first video image comprises a jump icon;

receiving an input used for selecting the jump icon;

obtaining, based on the input, a jump time of a jump target video associated with the jump icon; and playing a second video image, wherein the second video image is one frame of a video image associated with the jump time of the jump target video.

18. The terminal device according to claim 17, wherein the terminal device is further configured to:

receive the input, and obtain input location information of the input in the first video image; and determine, based on the input location information, that the input selects the jump icon.

19. The terminal device according to claim 17, wherein the terminal device is further configured to:

render the jump icon at a jump location of the first video image, wherein the first video image is one frame of a video image associated with a video frame identifier in the first video; or, render jump video prompt information at a jump location of the first video image, wherein the first video image is one frame of a video image associated with a video frame identifier in the first video.

20. The terminal device according to claim 17, wherein the jump target video is a second video, the second video image is one frame of a video image associated with a jump time of the second video;

wherein the terminal device is further configured to:

obtain, based on the input, a playing address of the second video associated with the jump icon; and determine the second video image based on the playing address of the second video and the jump time of the second video.

* * * * *